(12) United States Patent
Hoshihara et al.

(10) Patent No.: US 12,510,648 B2
(45) Date of Patent: Dec. 30, 2025

(54) VEHICLE OCCUPANT DETECTION SYSTEM AND VEHICLE OCCUPANT DETECTION METHOD

(71) Applicant: Mitsubishi Electric Corporation, Tokyo (JP)

(72) Inventors: Yasunori Hoshihara, Tokyo (JP); Takumi Takei, Tokyo (JP); Yoshikazu Tokuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 273 days.

(21) Appl. No.: 18/286,786

(22) PCT Filed: May 13, 2021

(86) PCT No.: PCT/JP2021/018245
§ 371 (c)(1),
(2) Date: Oct. 13, 2023

(87) PCT Pub. No.: WO2022/239195
PCT Pub. Date: Nov. 17, 2022

(65) Prior Publication Data
US 2024/0192351 A1    Jun. 13, 2024

(51) Int. Cl.
*G01S 13/56* (2006.01)

(52) U.S. Cl.
CPC ................... *G01S 13/56* (2013.01)

(58) Field of Classification Search
CPC ....................................................... G01S 13/56
USPC ........................................................... 342/28
See application file for complete search history.

(56) References Cited

U.S. PATENT DOCUMENTS

| | | | |
|---|---|---|---|
| 6,283,504 B1 * | 9/2001 | Stanley | B60N 2/0026 297/217.2 |
| 6,520,535 B1 | 2/2003 | Stanley et al. | |
| 6,563,231 B1 | 5/2003 | Stanley et al. | |

(Continued)

FOREIGN PATENT DOCUMENTS

| | | |
|---|---|---|
| JP | 2002-250776 A | 9/2002 |
| JP | 2002-533259 A | 10/2002 |

(Continued)

OTHER PUBLICATIONS

Japanese Office Action for Japanese Application No. 2023-520690, dated Nov. 7, 2023, with English translation.

(Continued)

*Primary Examiner* — Nuzhat Pervin
(74) *Attorney, Agent, or Firm* — BIRCH, STEWART, KOLASCH & BIRCH, LLP

(57) ABSTRACT

A vehicle occupant detection system includes: an identification unit that identifies whether or not an object in a vehicle is a person; a first detection unit that detects a velocity at which a person identified by the identification unit moves; a second detection unit that detects a situation regarding seating of the person identified by the identification unit; an output unit that outputs the situation regarding seating of the person, detected by the second detection unit; and a control unit that permits or prohibits output of the situation regarding seating of the person by the output unit on the basis of the velocity at which the person moves, detected by the first detection unit.

6 Claims, 13 Drawing Sheets

(56) References Cited

U.S. PATENT DOCUMENTS

| | | | | |
|---|---|---|---|---|
| 6,571,106 | B1* | 5/2003 | Li | G06F 5/06 |
| | | | | 709/208 |
| 6,577,023 | B1 | 6/2003 | Stanley et al. | |
| 8,798,907 | B2* | 8/2014 | Shida | G01S 5/0072 |
| | | | | 701/301 |
| 9,928,673 | B2* | 3/2018 | Berezin | G07C 9/28 |
| 9,994,152 | B1* | 6/2018 | Hess | G01S 13/931 |
| 10,429,500 | B2* | 10/2019 | Yamamoto | G06T 7/97 |
| 11,112,790 | B2* | 9/2021 | Gross | H04W 4/44 |
| 11,150,343 | B2* | 10/2021 | Sugae | G01S 15/87 |
| 11,230,293 | B2* | 1/2022 | Gomez | G01S 13/18 |
| 11,623,520 | B2* | 4/2023 | Tian | B60K 35/211 |
| | | | | 701/36 |
| 11,841,980 | B2* | 12/2023 | Kusayanagi | H04N 9/8205 |
| 12,168,412 | B2* | 12/2024 | Elad | H01Q 1/3233 |
| 2003/0023363 | A1* | 1/2003 | Katz | B60N 2/914 |
| | | | | 701/49 |
| 2003/0201894 | A1* | 10/2003 | Li | B60N 2/0029 |
| | | | | 340/457 |
| 2016/0161609 | A1* | 6/2016 | Tanaka | G01S 13/582 |
| | | | | 342/81 |
| 2019/0293777 | A1* | 9/2019 | Takemoto | G01S 13/42 |
| 2020/0225338 | A1* | 7/2020 | Nawaz | G01S 7/023 |
| 2020/0301003 | A1* | 9/2020 | Furuta | G01S 13/931 |
| 2021/0197668 | A1* | 7/2021 | Tian | B60K 35/81 |
| 2022/0171054 | A1* | 6/2022 | Tsushima | G01S 13/931 |
| 2023/0267233 | A1* | 8/2023 | Kusayanagi | G06V 40/172 |

FOREIGN PATENT DOCUMENTS

| | | | | |
|---|---|---|---|---|
| JP | 2018-202921 A | | 12/2018 | |
| JP | 2019-86354 A | | 6/2019 | |
| JP | 2019-168379 A | | 10/2019 | |
| JP | 2020-101415 A | | 7/2020 | |
| WO | WO-2007020808 A1 | * | 2/2007 | G06F 16/29 |
| WO | WO-2007046269 A1 | * | 4/2007 | G08G 1/0962 |

OTHER PUBLICATIONS

International Search Report (PCT/ISA/210) issued in PCT/JP2021/018245, dated Jul. 27, 2021.

Written Opinion of the International Searching Authority (PCT/ISA/237) issued in PCT/JP2021/018245, dated Jul. 27, 2021.

* cited by examiner

FIG. 7A
FIG. 7B
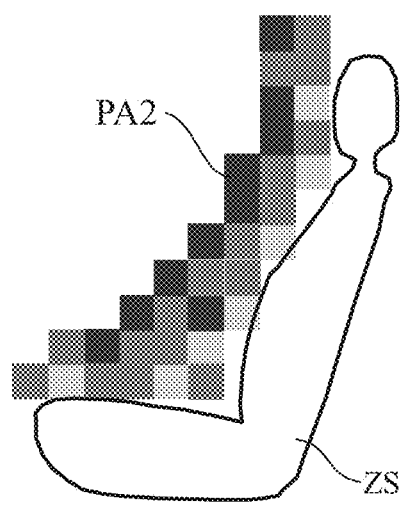
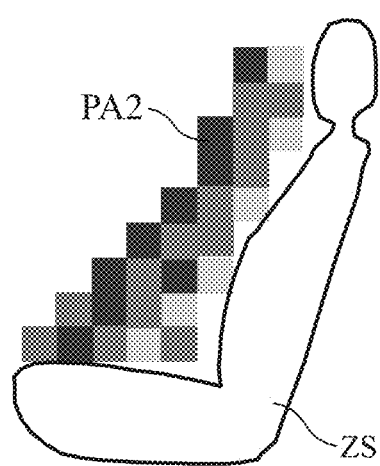

FIG. 12

| Case Number | Velocity V of Occupant | Door Open or Closed State Signal DS | Load Presence or Absence Signal KS | Ignition State Signal IS | Permission or Prohibition of Output |
|---|---|---|---|---|---|
| Case 1 | Within Range of Velocity Vth | Closed | ※ | ※ | Permitted |
| Case 2 | Within Range of Velocity Vth | Open | ※ | ※ | Prohibited |
| ... | ... | ... | ... | ... | ... |

KKT

VEHICLE OCCUPANT DETECTION SYSTEM AND VEHICLE OCCUPANT DETECTION METHOD

TECHNICAL FIELD

The present invention relates to a vehicle occupant detection system and a vehicle occupant detection method.

BACKGROUND ART

An occupant state detection system described in Patent Literature 1, which is an example of a vehicle occupant detection system, outputs a result of determining whether or not an object in a detection area in a vehicle is a person.

CITATION LIST

Patent Literature

Patent Literature 1: JP 2020-101415 A

SUMMARY OF INVENTION

Technical Problem

However, the vehicle occupant detection system has a problem that, in a case where the vehicle occupant detection system attempts to determine a situation of the person, for example, the physique of the person and a position where the person is seated when the object is not stationary, although a result of the determination may be incorrect due to the object not being stationary, the vehicle occupant detection system outputs the incorrect result of the determination.

An object of the present disclosure is to avoid outputting of an incorrect situation regarding seating of a person in a vehicle.

Solution to Problem

In order to solve the above problem, a vehicle occupant detection system according to the present disclosure includes: an identification device to identify whether or not an object in a vehicle is a person; a first detector to detect a velocity at which the person identified by the identification device moves; a second detector to detect a situation regarding seating of the person identified by the identification device; an output device to output the situation regarding seating of the person detected by the second detector; and a controller to permit or prohibit output of the situation regarding seating of the person by the output device on a basis of the velocity at which the person moves detected by the first detector.

Advantageous Effects of Invention

The vehicle occupant detection system according to the present disclosure can avoid outputting of an incorrect situation regarding seating of a person in the vehicle.

BRIEF DESCRIPTION OF DRAWINGS

FIG. 7A illustrates a three-dimensional spatial distribution (part 1) in the embodiment. FIG. 7B illustrates a three-dimensional spatial distribution (part 2) in the embodiment.

FIG. 12 illustrates a permission/prohibition table KKT in Modification 1.

DESCRIPTION OF EMBODIMENTS

Embodiment

Hereinafter, an embodiment of a vehicle occupant detection system according to the present disclosure will be described.

<Vehicle, Object, Coordinate System, Distance, Velocity, and Angles in Embodiment>

Figure 1:
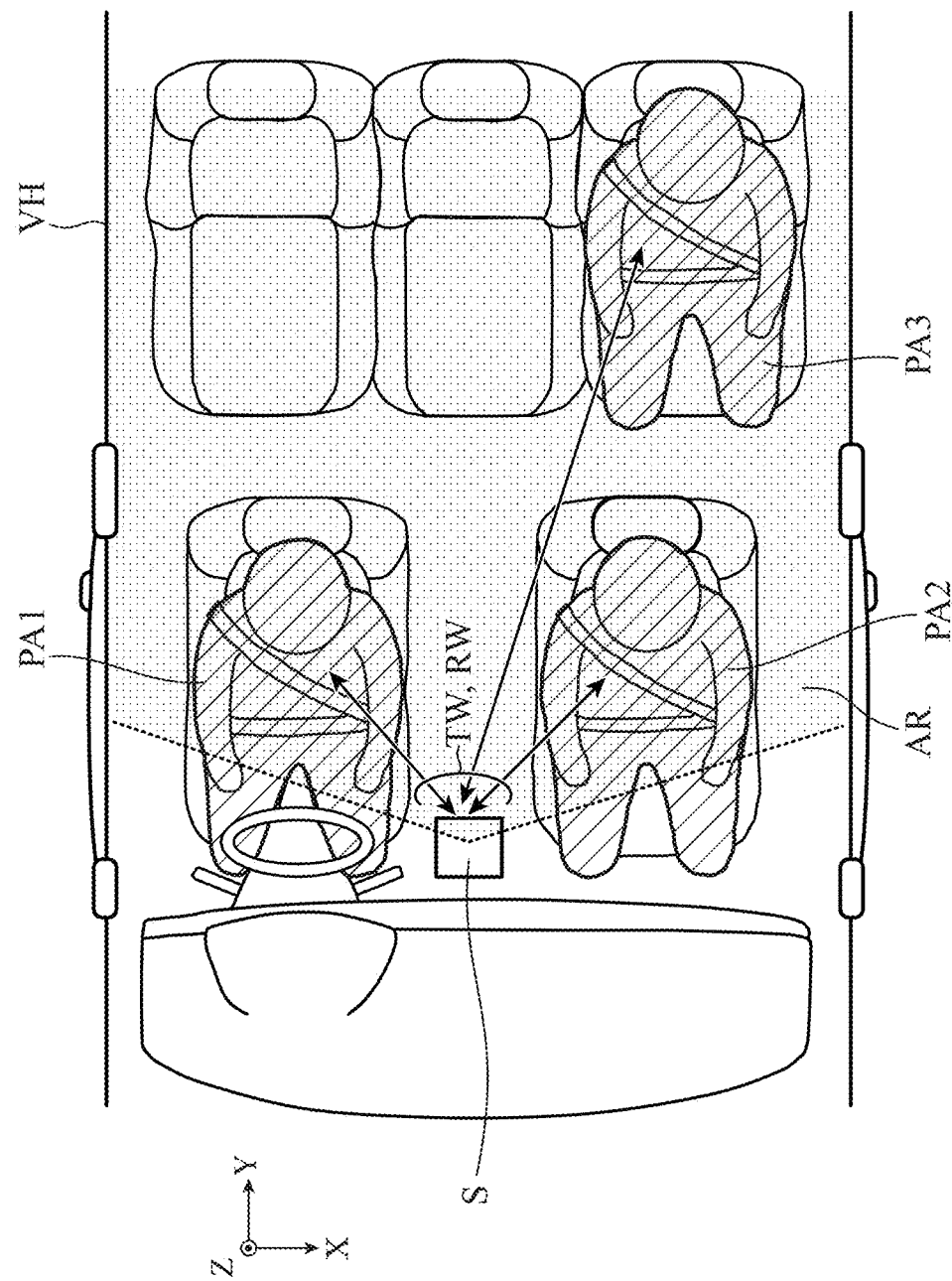
FIG. 1 illustrates a relationship (part 1) between a vehicle and a coordinate system in an embodiment.

FIG. 1 illustrates a relationship (part 1) between a vehicle and a coordinate system in the embodiment.

Figure 2:
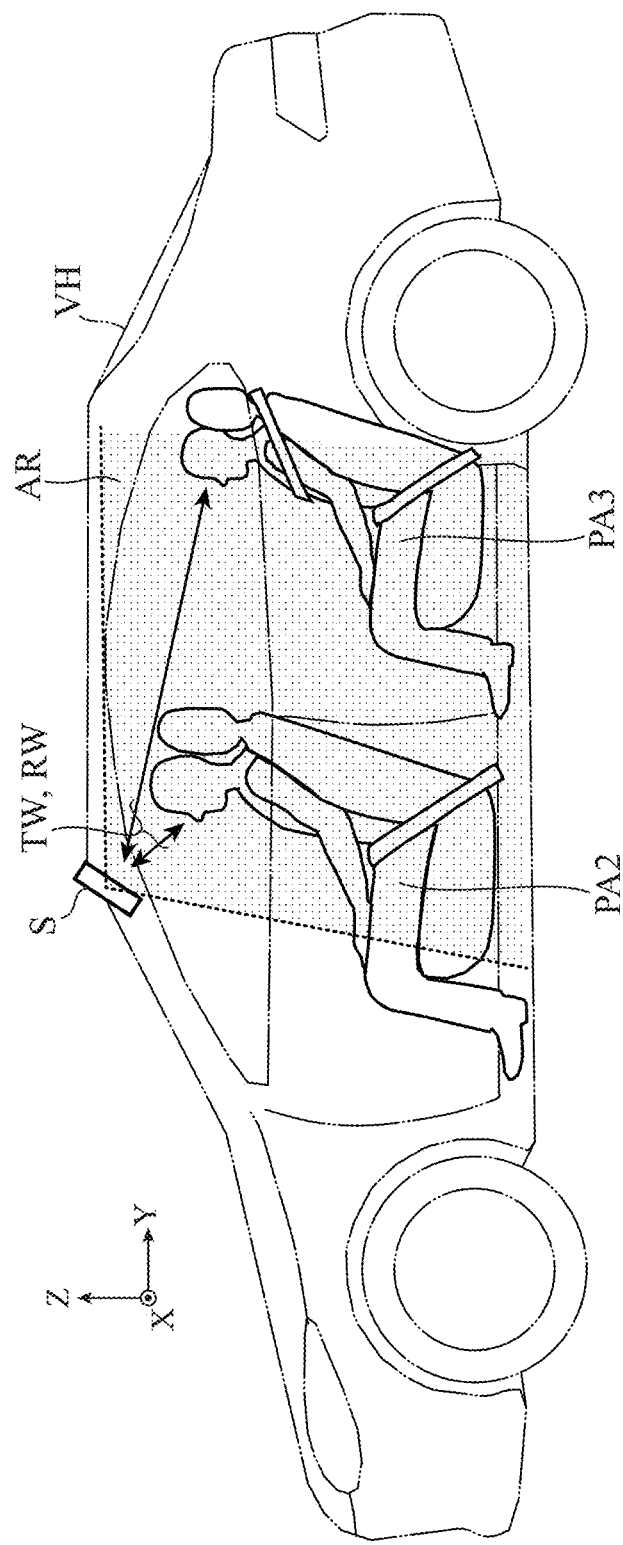
FIG. 2 illustrates a relationship (part 2) between the vehicle and the coordinate system in the embodiment.

FIG. 2 illustrates a relationship (part 2) between the vehicle and the coordinate system in the embodiment.

FIG. 3 illustrates a relationship between the coordinate system and each of a distance, a velocity, and angles in the embodiment.

As illustrated in FIGS. 1 and 2, a vehicle occupant detection system S of the embodiment is disposed between a driver's seat and an assistant driver's seat, on the ceiling in a vehicle VH. For example, as illustrated in FIGS. 1 and 2, three occupants PA1 to PA3 are seated in the vehicle VH. The vehicle occupant detection system S transmits a transmission wave TW over an irradiation range AR and receives a reception wave RW reflected in the irradiation range AR in order to perform identification, detection, output, and the like (details will be described later) in the vehicle VH.

Figure 3A:
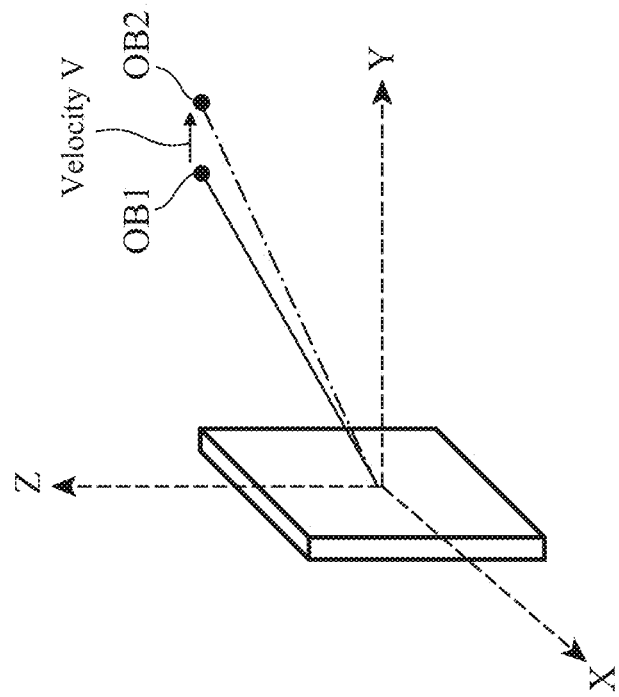
FIG. 3A illustrates a relationship (part 1) between the coordinate system and each of a distance, a velocity, and an angle in the embodiment.

In the following description, formally, as illustrated in FIGS. 1, 2, and 3A, an orthogonal coordinate system in which a width direction of the vehicle VH is defined as the X direction, a length direction of the vehicle VH is defined as the Y axis direction, and a height direction of the vehicle VH is defined as the Z axis are used as a base. Meanwhile, substantially, as illustrated in FIG. 3B, a polar coordinate system in which the distance r, the azimuth angle D, and the elevation angle Θ are defined is adopted.

Figure 3B:
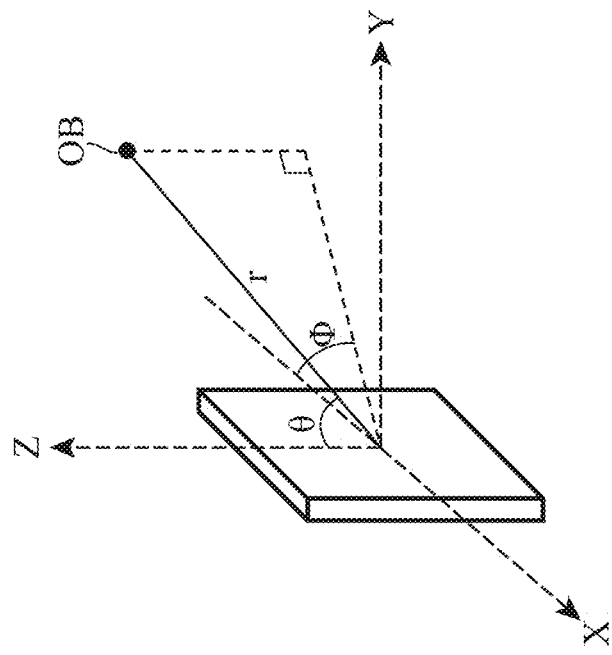
FIG. 3B illustrates a relationship (part 2) between the coordinate system and each of the distance, the velocity, and the angle in the embodiment.

As for a velocity, a velocity when an object OB1, which is an object OB before movement, moves to an object OB2, which is the object OB after the movement, is defined as a velocity V under the polar coordinate system illustrated in FIG. 3B.

Configuration of Embodiment

Figure 4:
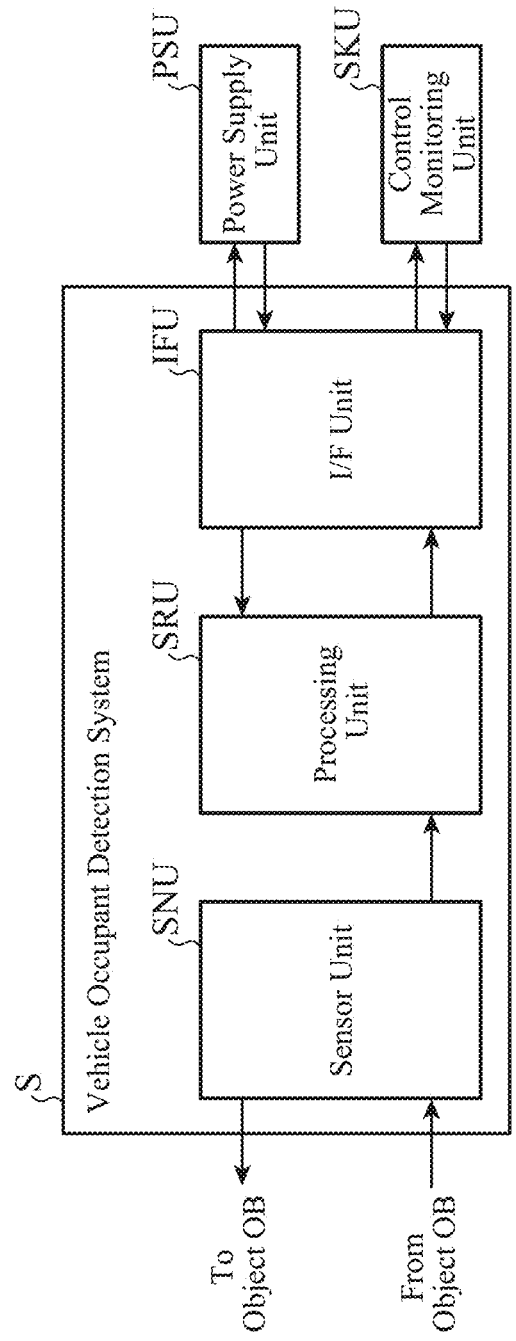
FIG. 4 is a functional block diagram of a vehicle occupant detection system S of the embodiment.

FIG. 4 is a functional block diagram of the vehicle occupant detection system S of the embodiment. Hereinafter, a function of the vehicle occupant detection system S of the embodiment will be described with reference to FIG. 4.

As illustrated in FIG. 4, the vehicle occupant detection system S of the embodiment includes a sensor unit SNU, a processing unit SRU, and an I/F unit IFU in order to identify the object OB in the vehicle VH (for example, illustrated in FIG. 1), for example, the occupants PA1 to PA3 (for example, illustrated in FIG. 1). The I/F is an abbreviation of an interface.

The vehicle occupant detection system S of the embodiment is connected to a control monitoring unit SKU and a power supply unit PSU in order to exchange signals related to the above-described identification or the like, and exchange power.

The control monitoring unit SKU controls and monitors an operation of the vehicle VH.

The power supply unit PSU supplies power to the vehicle occupant detection system S, that is, an identification unit SK, a first detection unit KN1, a second detection unit KN2, an output unit SR, and a control unit SG.
<Function of Sensor Unit SNU>

Figure 5:
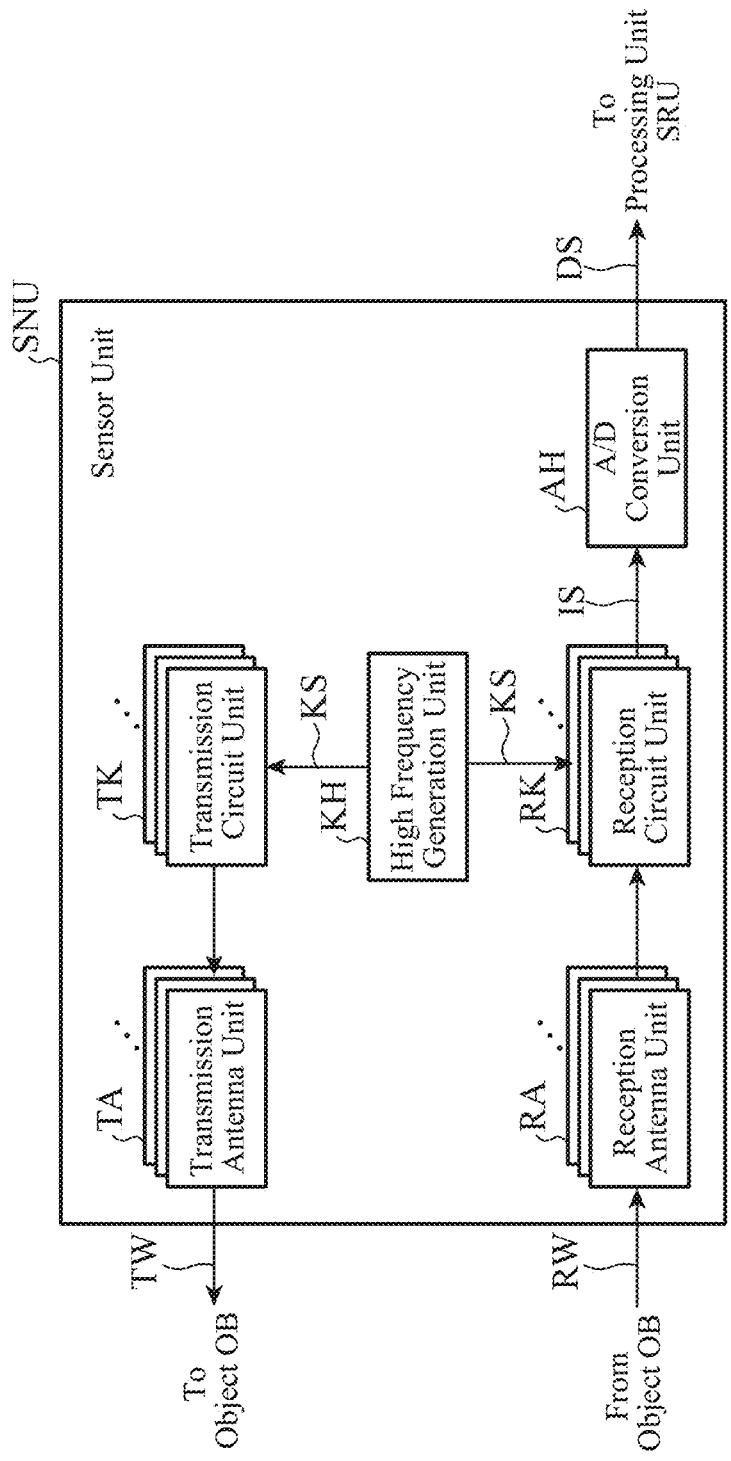
FIG. 5 is a functional block diagram of a sensor unit SNU in the embodiment.

FIG. 5 is a functional block diagram of the sensor unit SNU in the embodiment.

As illustrated in FIG. 5, the sensor unit SNU in the embodiment includes a plurality of transmission antenna units TA, a plurality of transmission circuit units TK, a high frequency generation unit KH, a plurality of reception antenna units RA, a plurality of reception circuit units RK, and an A/D conversion unit AH.

As in a conventionally known technique, for example, under a frequency modulation continuous wave (FM-CW) system, the high frequency generation unit KH generates a high frequency signal KS that is a chirp wave. The plurality of transmission circuit units TK amplifies the generated high frequency signal KS. The plurality of transmission antenna units TA transmits a transmission wave TW, which is an amplified high frequency signal, toward the inside of the vehicle VH. The transmission wave TW is transmitted over the irradiation range AR (for example, illustrated in FIG. 1).

Meanwhile, as in a conventionally known technique, the plurality of reception antenna units RA receives a reception wave RW reflected by the object OB in the irradiation range AR in the vehicle VH, for example, the three occupants PA1 to PA3, seats, doors, and the like among the transmission waves TW. The plurality of reception circuit units RK converts the received reception wave RW into an intermediate frequency signal IS, which is a difference between the reception wave RW and the high frequency signal KS, using the high frequency signal KS. The A/D conversion unit AH converts the intermediate frequency signal IS from an analog signal into a digital signal DS, and outputs the digital signal DS to the processing unit SRU.
<Function of Processing Unit SRU>

Figure 6:
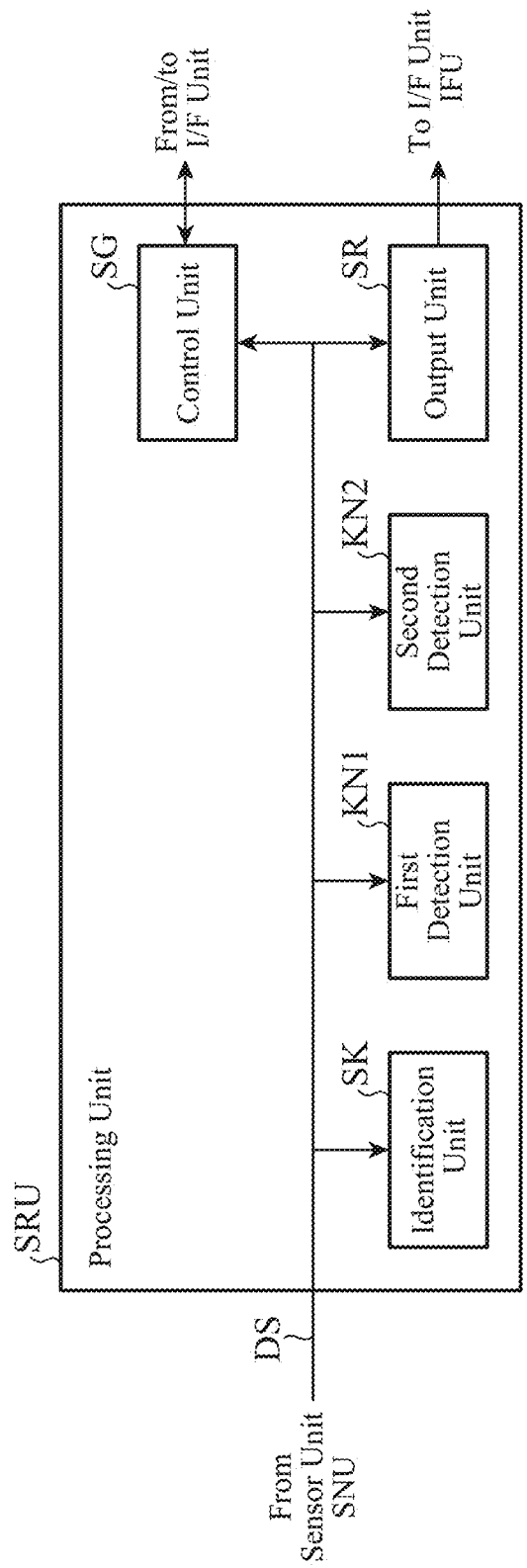
FIG. 6 is a functional block diagram of a processing unit SRU in the embodiment.

FIG. 6 is a functional block diagram of the processing unit SRU in the embodiment.

As illustrated in FIG. 6, the processing unit SRU in the embodiment includes the identification unit SK, the first detection unit KN1, the second detection unit KN2, the output unit SR, and the control unit SG.

The identification unit SK corresponds to an "identification unit", the first detection unit KN1 corresponds to a "first detection unit", the second detection unit KN2 corresponds to a "second detection unit", the output unit SR corresponds to an "output unit", and the control unit SG corresponds to a "control unit".

The vehicle VH corresponds to a "vehicle", the object OB corresponds to an "object", and the occupants PA1 to PA3 correspond to "persons".

The identification unit SK identifies, on the basis of the digital signal DS output from the sensor unit SNU, whether or not the object OB in the vehicle VH is a person depending on whether or not the object OB is a moving object.

The first detection unit KN1 detects a velocity V at which a person identified by the identification unit SK moves.

The second detection unit KN2 generates a three-dimensional spatial distribution SKB on the basis of the detection result of the first detection unit KN1, determines that the object OB is a person from the shape and position of the object OB, and detects, for example, the physique of the occupant and a position where the occupant is seated.

FIG. 7 illustrates a three-dimensional spatial distribution in the embodiment.

As illustrated in FIGS. 7A and 7B, the three-dimensional spatial distribution SKB is a probability distribution of a position where the object OB, for example, the occupant PA2 having a standard physique, that is, having a standard sitting height and having a standard degree of fleshiness is present. The three-dimensional spatial distributions SKB illustrated in FIGS. 7A and 7B indicate that the occupant PA2 is present at a higher probability at a darker position.

For example, the three-dimensional spatial distribution SKB of FIG. 7A indicates that the object OB may be present at a position slightly higher with respect to the height of a seat ZS. Therefore, it is suggested that the occupant PA2 may have a relatively high sitting height.

Meanwhile, the three-dimensional spatial distribution SKB of FIG. 7B indicates that the occupant PA2 may be present at a position slightly lower with respect to the height of the seat ZS. Thus, it is suggested that the occupant PA2 may have a relatively low sitting height.

Figure 8:
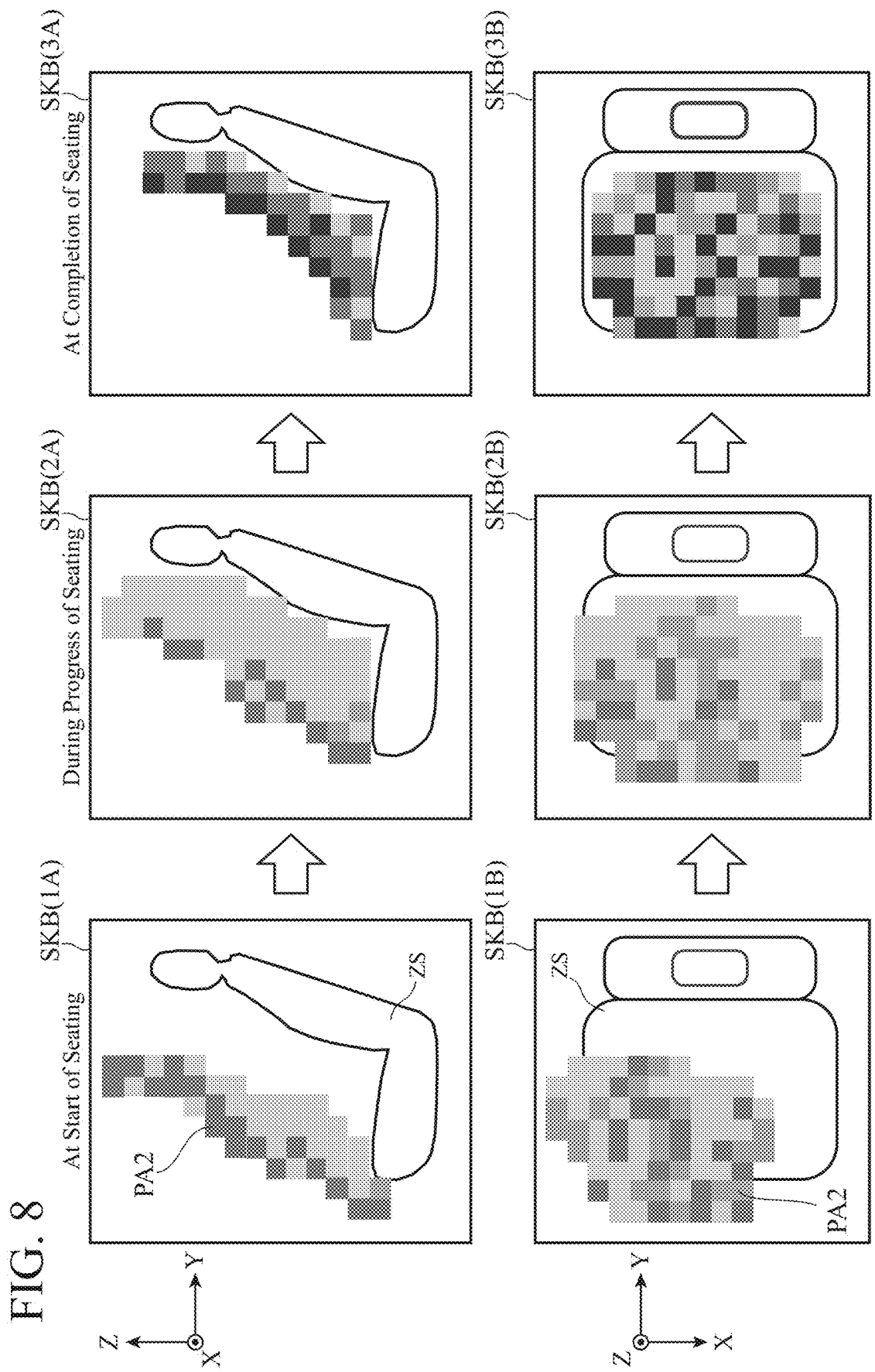
FIG. 8 illustrates a three-dimensional spatial distribution in the embodiment.

FIG. 8 illustrates a three-dimensional spatial distribution in the embodiment.

As illustrated in FIG. 8, a three-dimensional spatial distribution SKB (1A) at start of seating indicates that the occupant PA2 has an extremely high sitting height. Therefore, it is not preferable for the output unit SR to output the situation regarding seating of the occupant PA2, detected by the second detection unit KN2 on the basis of the three-dimensional spatial distribution SKB (1A), in other words, the output unit SR is desirably prohibited from performing output.

Similarly, as illustrated in FIG. 8, a three-dimensional spatial distribution SKB (2A) during progress of seating indicates that the occupant PA2 is extremely fat. Therefore, it is not preferable for the output unit SR to output the situation regarding seating of the occupant PA2, detected by the second detection unit KN2 on the basis of the three-dimensional spatial distribution SKB (2A), in other words, the output unit SR is desirably prohibited from performing output.

In contrast to the above both cases, as illustrated in FIG. 8, a three-dimensional spatial distribution SKB (3A) at completion of seating suggests that the occupant PA2 has a standard sitting height and a standard degree of fleshiness. Therefore, it is preferable for the output unit SR to output the situation regarding seating of the occupant PA2, detected by the second detection unit KN2 on the basis of the three-dimensional spatial distribution SKB (3A), in other words, output by the output unit SR is desirably permitted.

The output unit SR outputs, to the I/F unit IFU, the situation regarding seating of the person, detected by the second detection unit KN2.

The control unit SG permits or prohibits output of the situation regarding seating of the person by the output unit SR on the basis of the velocity V at which the person moves, detected by the first detection unit KN1.

<Function of I/F Unit IFU>

Figure 9:
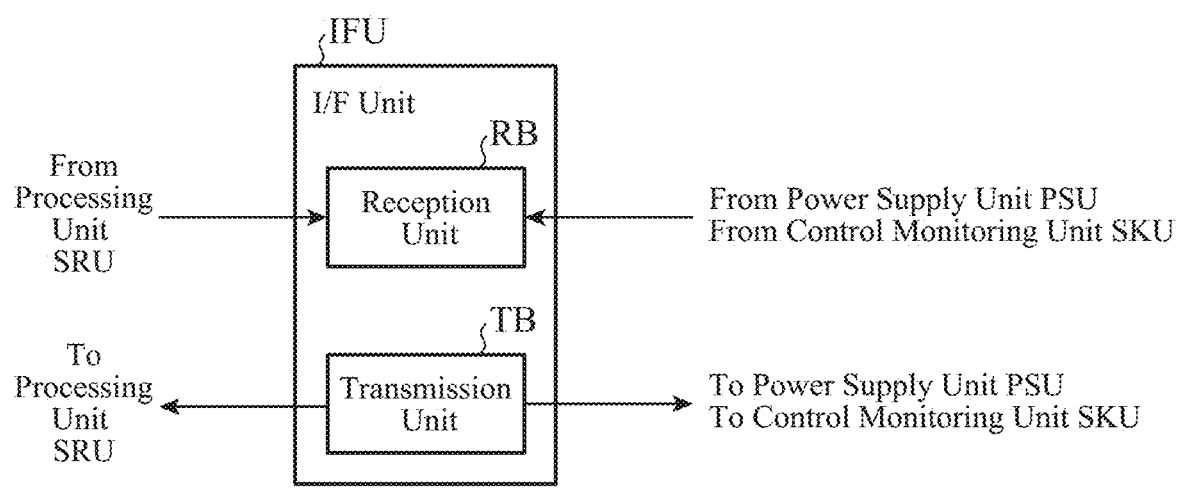
FIG. 9 is a functional block diagram of an I/F unit IFU in the embodiment.

FIG. 9 is a functional block diagram of the I/F unit IFU in the embodiment.

As illustrated in FIG. 9, the I/F unit IFU includes a reception unit RB and a transmission unit TB.

The reception unit RB receives a signal related to the above-described identification or the like and a signal related to power from the processing unit SRU, the power supply unit PSU, and the control monitoring unit SKU.

In contrast to the above, the transmission unit TB transmits a signal related to the above-described identification or the like and a signal related to power to the processing unit SRU, the power supply unit PSU, and the control monitoring unit SKU.

<Configuration of Processing Unit SRU>

Figure 10:
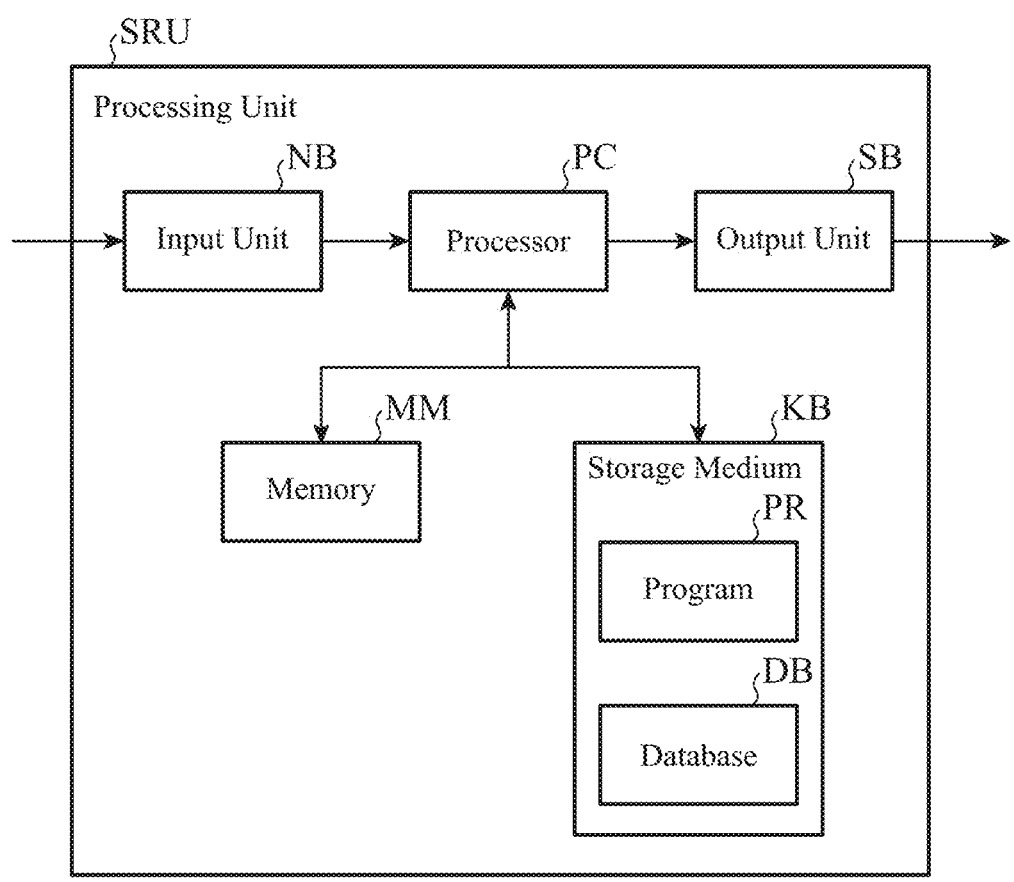
FIG. 10 illustrates a configuration of the processing unit SRU in the embodiment.

FIG. 10 illustrates a configuration of the processing unit SRU in the embodiment.

As illustrated in FIG. 10, the processing unit SRU in the embodiment includes an input unit NB, a processor PC, an output unit SB, a memory MM, and a storage medium KB in order to perform the above-described functions. More precisely, the processing unit SRU in the embodiment includes the input unit NB and the output unit SB as necessary.

The input unit NB is constituted by, for example, a camera or a touch panel. The processor PC is a well-known computer core that operates hardware according to software. The output unit SB is constituted by, for example, a liquid crystal monitor or a touch panel. The memory MM is constituted by, for example, a dynamic random access memory (DRAM) or a static random access memory (SRAM). The storage medium KB is constituted by, for example, a hard disk drive (HDD), a solid state drive (SSD), or a read only memory (ROM).

The storage medium KB stores a program PR and a database DB. The program PR is a command group that defines contents of processing to be executed by the processor PC. The database DB is, for example, a permission/prohibition table KKT (described later in Modification 1).

Regarding a relationship between a function and a configuration in the processing unit SRU, on hardware, the processor PC executes the program PR stored in the storage medium KB on the memory MM and controls operations of the input unit NB and the output unit SB as necessary, and functions of the identification unit SK, the first detection unit KN1, the second detection unit KN2, the output unit SR, and the control unit SG are thereby implemented.

Operation of Embodiment

Figure 11:
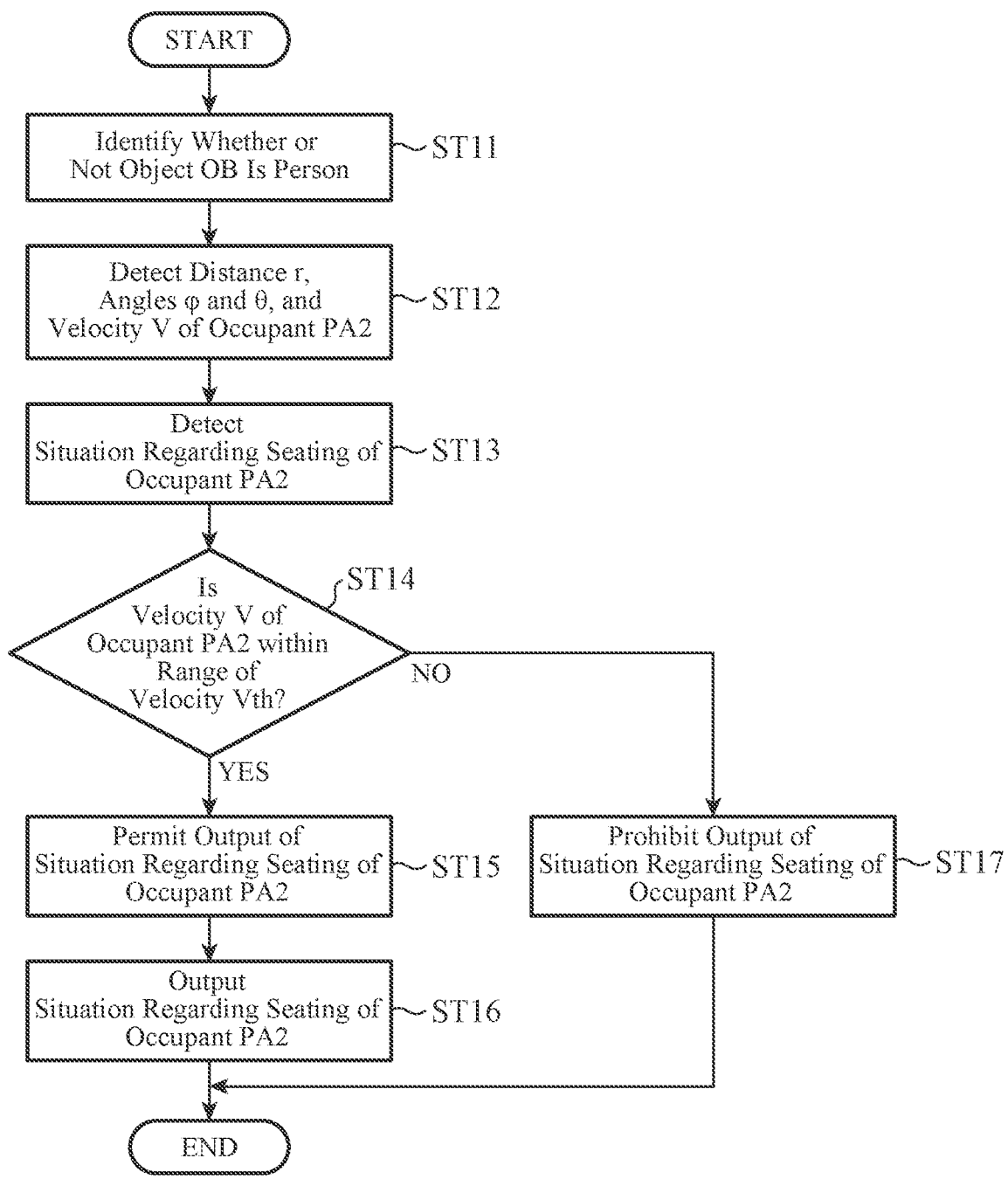
FIG. 11 is a flowchart illustrating an operation of the vehicle occupant detection system S of the embodiment.

FIG. 11 is a flowchart illustrating an operation of the vehicle occupant detection system S of the embodiment.

The operation of the vehicle occupant detection system S of the embodiment will be described with reference to the flowchart of FIG. 11.

In the following description, in order to facilitate description and understanding, it is assumed that only the occupant PA2 (for example, illustrated in FIG. 1) is present in the vehicle VH.

Step ST11: As in a conventionally known technique, by analyzing the digital signal DS (illustrated in FIG. 6), the identification unit SK (illustrated in FIG. 6) identifies whether the object OB in the irradiation range AR (for example, illustrated in FIG. 1) is moving or stationary, in other words, identifies whether the object OB is a person or something other than a person.

When an amplitude, a frequency, or a phase of the reception wave RW (for example, illustrated in FIG. 1) is not uniform by the analysis of the digital signal DS, the identification unit SK determines that the object OB is moving, in other words, identifies that the object OB is a person, that is, identifies that the object OB is the occupant PA2.

In contrast to the above, when an amplitude, a frequency, or a phase of the reception wave RW is uniform by the analysis of the digital signal DS, the identification unit SK determines that the object OB is stationary, in other words, identifies that the object OB is something other than a person.

Step ST12: As in a conventionally known technique, by analyzing the digital signal DS under the above-described FM-CW system, the plurality of transmission functions (the plurality of transmission antenna units TA and the plurality of transmission circuit units TK), and the plurality of reception functions (the plurality of reception circuit units RA and the plurality of reception antenna units RK), the first detection unit KN1 detects the distance r to the occupant PA2, the angles (the azimuth angle $\Phi$ and the elevation angle $\Theta$) of the occupant PA2, and the velocity V of the occupant PA2.

Step ST13: As in a conventionally known technique, by analyzing the digital signal DS, the second detection unit KN2 generates the three-dimensional spatial distribution SKB (for example, illustrated in FIG. 8). The second detection unit KN2 detects a situation regarding seating of the occupant PA2, for example, a position where the occupant PA2 is seated and the physique of the occupant PA2 on the basis of the three-dimensional spatial distribution SKB and also in consideration of the velocity V.

Step ST14: The control unit SG determines whether or not the velocity V of the occupant PA2 detected by the first detection unit KN1 is within a range of a velocity Vth predetermined as a determination reference. If it is determined that the velocity V of the occupant PA2 is within the range of the predetermined velocity Vth, the process proceeds to step ST15 via "YES". Meanwhile, if it is determined that the velocity V of the occupant PA2 is not within the range of the predetermined velocity Vth, the process proceeds to step ST17.

Step ST15: The control unit SG permits the output unit SR to output the situation regarding seating of the occupant PA2.

Step ST16: The output unit SR outputs the situation regarding seating of the occupant PA2 to the IF unit IFU. The I/F unit IFU further outputs the situation regarding seating of the occupant PA2 to, for example, the control monitoring unit SKU.

Step ST17: The control unit SG prohibits the output unit SR from outputting the situation regarding seating of the occupant PA2.

Effects of Embodiment

As described above, in the vehicle occupant detection system S of the embodiment, when the velocity V at which the occupant PA2 moves is within the range of the predetermined velocity Vth, the control unit SG permits the output unit SR to output the situation regarding seating of the occupant PA2. Meanwhile, when the velocity V at which the occupant PA2 moves is not within the range of the predetermined velocity Vth, the control unit SG prohibits the output unit SR from outputting the situation regarding seating of the occupant PA2. As a result, it is possible to suppress occurrence of a matter that the output unit SR outputs a situation regarding seating of the occupant PA2, which is detected by the second detection unit KN2 and which may be incorrect.

MODIFICATIONS

Modification 1

A vehicle occupant detection system S of Modification 1 has a similar function and configuration to the function and configuration (illustrated in FIG. 5 and the like) of the vehicle occupant detection system S of the embodiment.

Meanwhile, in the vehicle occupant detection system S of Modification 1, the processing unit SRU further includes a permission/prohibition table KKT, unlike the vehicle occupant detection system S of the embodiment.

FIG. 12 illustrates the permission/prohibition table KKT in Modification 1.

Figure 13:
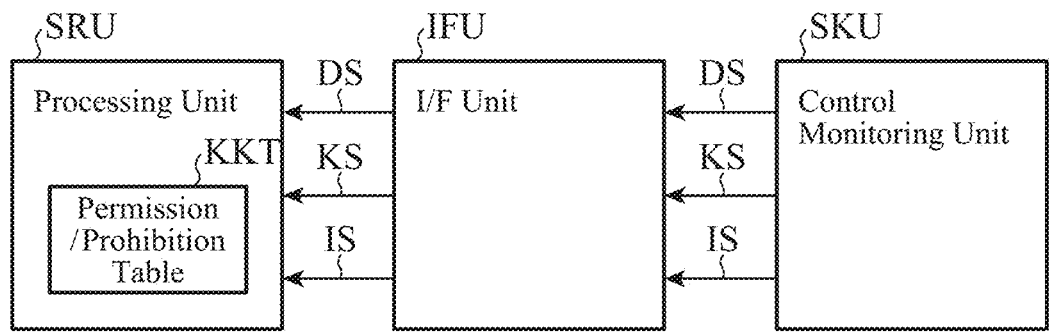
FIG. 13 illustrates a signal between a processing unit SRU and a control monitoring unit SKU in Modification 1.

FIG. 13 illustrates a signal between the processing unit SRU and the control monitoring unit SKU in Modification 1.

As illustrated in FIG. 12, the permission/prohibition table KKT indicates a relationship among a case number, the velocity V of an occupant, a door open or closed state signal DS, a load presence or absence signal KS, an ignition state signal IS, and permission or prohibition of output by the output unit SR. In FIG. 12, the symbol "*" means being ignored.

The case number is a serial number assigned to each case.

The door open or closed state signal DS indicates whether a door of the vehicle VH is open or closed as the occupants PA1 to PA3 each gets on the vehicle VH or gets off the vehicle VH. The load presence or absence signal KS indicates whether or not a load is applied to a seat due to seating of each of the occupants PA1 to PA3. The ignition state signal IS indicates whether an ignition is on or off, for example, by start of an engine by the occupant PA1.

The door open or closed state signal DS, the load presence or absence signal KS, and the ignition state signal IS indicate whether or not seating or unseating by the occupants PA1 to PA3 has been completed and whether or not the occupants PA1 to PA3 have completed movement from one seat to another, by a combination of the velocity V at which each of the occupants PA1 to PA3 moves, for example, the velocity V at which the occupant PA2 moves with at least one of the three signals described above.

For example, the velocity V at which the occupant PA2 moves and the door open or closed state signal DS indicating that a door of the vehicle VH is closed indicate, in cooperation with each other, that the occupant PA2 has completed seating. In addition, for example, the velocity V at which the occupant PA1 moves and the ignition state signal IS indicating that an ignition is on indicate that the occupant PA1 has completed seating, in cooperation with each other. Furthermore, for example, the velocity V at which the occupant PA2 moves, and the load presence or absence signal KS continuously indicating that unseating from one seat (for example, a driver's seat) has been completed and seating on another seat (for example, an assistant driver's seat) has been completed indicate that the occupant PA2 has completed movement from one seat to another in cooperation with each other.

As described above, in addition to storing the permission/prohibition table KKT, as illustrated in FIG. 13, the processing unit SRU receives, as inputs, the door open or closed state signal DS, the load presence or absence signal KS, and the ignition state signal IS, and more specifically receives these signals, as inputs, from the control monitoring unit SKU via the I/F unit IFU.

In the processing unit SRU, by referring to the permission/prohibition table KKT, the control unit SG permits or prohibits output of the situation regarding seating of the occupant by the output unit SR on the basis of the velocity V at which the occupant moves, the door open or closed state signal DS, the load presence or absence signal KS, and the ignition state signal IS, which are input from the control monitoring unit SKU.

As illustrated in FIG. 12, for example, when the velocity V at which the occupant PA2 moves is "within the range of the velocity Vth" and the door open or closed state signal DS is "closed", the control unit SG permits the output unit SR to output the situation regarding seating of the occupant PA2. When the velocity V at which the occupant PA2 moves is "within the range of the velocity Vth" and the door open or closed state signal DS is "open", unlike the above, the control unit SG prohibits the output unit SR from outputting the situation regarding seating of the occupant PA2.

As described above, in the vehicle occupant detection system S of Modification 1, using the door open or closed state signal DS, the load presence or absence signal KS, and the ignition state signal IS in addition to the moving velocity V at which the occupant PA2 moves in the embodiment, in other words, in consideration of whether or not the occupant PA2 has completed seating and whether or not the occupant PA2 has completed movement from one seat to another, output of the situation regarding seating of the occupant PA2 by the output unit SR is permitted or prohibited. As a result, the permission or prohibition of the output by the output unit SR can be controlled with finer accuracy as compared with the vehicle occupant detection system S of the embodiment.

Modification 2

A vehicle occupant detection system S of Modification 2 has a similar function and configuration to the function and configuration (illustrated in FIG. 5 and the like) of the vehicle occupant detection system S of the embodiment.

Meanwhile, the vehicle occupant detection system S of Modification 2 considers a vehicle VH door opening or closing operation, unlike the vehicle occupant detection system S of the embodiment.

Figure 14:
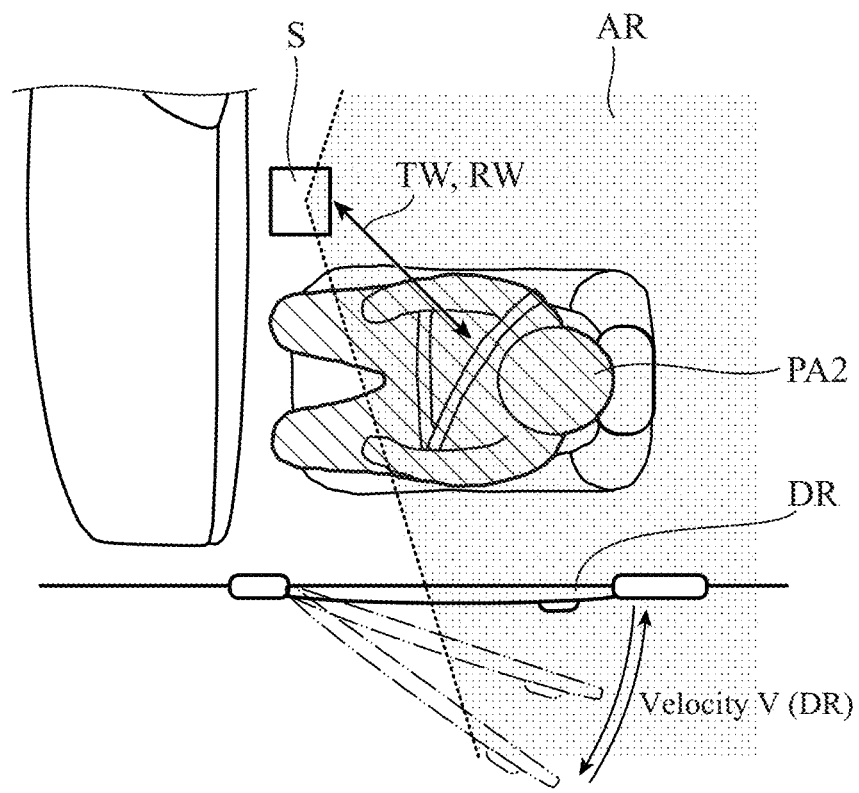
FIG. 14 illustrates a door opening or closing operation in Modification 2.

FIG. 14 illustrates a door opening or closing operation in Modification 2.

For example, the vehicle occupant detection system S of Modification 2 permits or prohibits output of the situation regarding seating of the occupant PA2 in consideration of a vehicle VH door DR opening or closing operation in addition to the velocity V at which the occupant PA2 moves.

As illustrated in FIG. 14, the transmission wave TW transmitted from the vehicle occupant detection system S reaches not only an area inside the vehicle VH but also an area outside the vehicle VH, in other words, reaches also an area and a space where the door DR opens or closes.

When the door DR is not stationary, more specifically, while the door DR is shifting from a closed state to an open state, and while the door DR is shifting from an open state to a closed state, the reception wave RW reflected by the door DR and returning to the vehicle occupant detection system S fluctuates due to an opening or closing operation of the door DR. When the reception wave RW fluctuates, for example, detection of the situation regarding seating of the occupant PA2 by the second detection unit KN2 is more likely to be incorrect.

An object of the vehicle occupant detection system S of Modification 2 is, for example, to prohibit output of an incorrect situation regarding seating of the occupant PA2 due to opening or closing of the door DR.

In order to achieve the above object, the vehicle occupant detection system S of Modification 2 has the following operation different from the operation (illustrated in FIG. 11) of the vehicle occupant detection system S of the embodiment.

Step ST12: In addition to detecting the velocity V at which the occupant PA2 moves and the like, the first detection unit KN1 detects a velocity V (DR) at which the door DR opens or closes.

Step ST14: In addition to determining whether or not the velocity V at which the occupant PA2 moves is within the range of the predetermined velocity Vth, the control unit SG determines whether or not the velocity V (DR) at which the door DR opens or closes is within a range of a predetermined velocity Vth (DR).

Only if it is determined that the velocity V at which the occupant PA2 moves is within the range of the predetermined velocity Vth and the velocity V (DR) at which the door DR opens or closes is within the range of the predetermined velocity Vth (DR), the process proceeds to step ST15 via "YES". Meanwhile, in other cases, specifically, for example, regardless of whether or not the velocity V at which the occupant PA2 moves is within the range of the predetermined velocity Vth, if the velocity V (DR) at which the door DR opens or closes is not within the range of the predetermined velocity Vth (DR), the process proceeds to step ST17.

As described above, in the vehicle occupant detection system S of Modification 2, when the velocity V (DR) at which the door DR opens or closes is not within the range of the predetermined velocity Vth (DR), the control unit SG prohibits the output unit SR from outputting the situation regarding seating of the occupant PA2. As a result, it is possible to avoid outputting of the situation regarding seating of the occupant PA2, which may be incorrect due to the door DR opening or closing operation.

Modification 3

A vehicle occupant detection system S of Modification 3 has a similar function and configuration to the function and configuration (illustrated in FIG. 5 and the like) of the vehicle occupant detection system S of the embodiment.

Meanwhile, the vehicle occupant detection system S of Modification 3 controls an operation of the power supply unit PSU and operations of the identification unit SK, the first detection unit KN1, the second detection unit KN2, and the output unit SR in the processing unit SRU in consideration of opening and closing of a door of the vehicle VH, unlike the vehicle occupant detection system S of the embodiment.

In the vehicle occupant detection system S of Modification 3, more specifically, the control unit SG in the processing unit SRU receives, as an input, a signal indicating opening or closing of the door of the vehicle VH from the control monitoring unit SKU via the I/F unit IFU. The control unit SG starts to receive power supply from the power supply unit PSU in order to activate at least one of the identification unit SK, the first detection unit KN1, the second detection unit KN2, and the output unit SR on the basis of the input signal.

The control unit SG further starts an operation of at least one of the identification unit SK, the first detection unit KN1, the second detection unit KN2, and the output unit SR on the basis of the input signal.

As described above, by starting the above-described power supply and starting operations of the identification unit SK and the like in response to the signal indicating opening or closing of the door of the vehicle VH, it is possible to output the situation regarding seating of the occupants PA1 to PA3 without delay after the occupants PA1 to PA3 get on the vehicle VH.

The above-described embodiment and Modifications may be combined without departing from the gist of the present disclosure, the components of the embodiment and Modifications may be appropriately omitted or changed, or other components may be added.

INDUSTRIAL APPLICABILITY

The vehicle occupant detection system according to the present disclosure can be used, for example, in order to control whether or not to output a situation regarding seating of an occupant in a vehicle.

REFERENCE SIGNS LIST

AH: A/D conversion unit, AR: irradiation range, DB: database, DR: door, DS: door open or closed state signal, DS: digital signal, IFU: I/F unit, IS: ignition state signal, IS: intermediate frequency signal, KB: storage medium, KH: high frequency generation unit, KKT: permission/prohibition table, KN1: first detection unit, KN2: second detection unit, KS: load presence or absence signal, KS: high frequency signal, MM: memory, NB: input unit, OB: object, OB1: object, OB2: object, PA1: occupant, PA2: occupant, PA3: occupant, PC: processor, PR: program, PSU: power supply unit, r: distance, RA: reception antenna unit, RB: reception unit, RK: reception circuit unit, RW: reception wave, S: vehicle occupant detection system, SB: output unit, SG: control unit, SK: identification unit, SKB: three-dimensional spatial distribution, SKU: control monitoring unit, SNU: sensor unit, SR: output unit, SRU: processing unit, ST11: step, ST12: step, ST13: step, ST14: step, ST15: step, ST16: step, ST17: step, TA: transmission antenna unit, TB: transmission unit, TK: transmission circuit unit, TW: transmission wave, V: velocity, VH: vehicle, Vth: velocity, ZS: seat, Θ: elevation angle, Φ: azimuth angle

The invention claimed is:

1. A vehicle occupant detection system comprising:
an identification device to identify whether or not an object in a vehicle is a person;
a first detector to detect a velocity at which the person identified by the identification device moves;
a second detector to detect a situation regarding seating of the person identified by the identification device;
an output device to output the situation regarding seating of the person detected by the second detector; and
a controller to permit or prohibit output of the situation regarding seating of the person by the output device on a basis of the velocity at which the person moves detected by the first detector.

2. The vehicle occupant detection system according to claim 1, wherein
the controller permits the output device to output the situation regarding seating of the person when the velocity at which the person moves is within a predetermined range.

3. The vehicle occupant detection system according to claim 1, wherein
the controller permits or prohibits output of the situation regarding seating of the person by the output device on a basis of at least one of seating on a seat in the vehicle by the person and movement from one seat to another seat in the vehicle by the person in addition to the velocity at which the person moves.

4. The vehicle occupant detection system according to claim 1, wherein
the identification device detects whether or not another object other than the object is a person, and
the first detector detects a velocity at which said another object identified as not being a person by the identification device moves, and
the controller permits or prohibits output of the situation regarding seating of the person by the output device on a basis of the velocity at which said another object moves detected by the first detector.

5. The vehicle occupant detection system according to claim 1, wherein
the controller starts power supply for at least one of the identification device, the first detector, the second detector, the output device, and the controller on a basis of opening or closing of a door of the vehicle, and starts an operation of at least one of the identification device, the first detector, the second detector, and the output device.

6. A vehicle occupant detection method comprising:
identifying, by an identification device, whether or not an object in a vehicle is a person;
detecting, by a first detector, a velocity at which the person identified by the identification device moves;
detecting, by a second detector, a situation regarding seating of the person identified by the identification device;
outputting, by an output device, the situation regarding seating of the person, detected by the second detector; and
permitting or prohibiting, by a controller, output of the situation regarding seating of the person by the output device on a basis of the velocity at which the person moves detected by the first detector.

* * * * *